US012265160B2

(12) United States Patent
Mori et al.

(10) Patent No.: US 12,265,160 B2
(45) Date of Patent: Apr. 1, 2025

(54) POSITIONING APPARATUS

(71) Applicant: Mitsubishi Electric Corporation, Tokyo (JP)

(72) Inventors: Kohei Mori, Tokyo (JP); Tomoya Kawagoe, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 358 days.

(21) Appl. No.: 17/850,189

(22) Filed: Jun. 27, 2022

(65) Prior Publication Data

US 2023/0061209 A1 Mar. 2, 2023

(30) Foreign Application Priority Data

Aug. 26, 2021 (JP) ................................. 2021-137713

(51) Int. Cl.
*G01S 19/12* (2010.01)
*G01S 19/05* (2010.01)
(Continued)

(52) U.S. Cl.
CPC .............. *G01S 19/12* (2013.01); *G01S 19/05* (2013.01); *G05D 1/0278* (2013.01)

(58) Field of Classification Search
CPC . G01S 19/12; G01S 19/05; G01S 5/01; G01S 5/018; G01S 19/14; G01S 19/50;
(Continued)

(56) References Cited

U.S. PATENT DOCUMENTS 6,301,530 B1 * 10/2001 Tamura .................. G05D 1/024
340/436
2010/0063672 A1 * 3/2010 Anderson ............ G05D 1/0077
701/29.2
(Continued)

FOREIGN PATENT DOCUMENTS

JP   2014-173891 A    9/2014
JP   6025430 B2      11/2016
(Continued)

OTHER PUBLICATIONS

Communication dated Aug. 30, 2022 from the Japanese Patent Office in Application No. 2021-137713.

*Primary Examiner* — Mussa A Shaawat
(74) *Attorney, Agent, or Firm* — Sughrue Mion, PLLC

(57) ABSTRACT

To provide a positioning apparatus which can reduce the error of the positioning information of the positioning satellite, by using either appropriate one of the positioning reinforcement information by the ground channel or the positioning reinforcement information by the satellite channel, according to execution state of the automatic driving. A positioning apparatus receives positioning information from positioning satellites; calculates a first own position based on the positioning information and the positioning reinforcement information of the ground base station; calculates a second own position based on the positioning information and the positioning reinforcement information of the satellite; determines either the first own position or the second own position to be used, based on whether or not the driving mode is the automatic driving mode; and outputs the first own position or the second own position determined to be used, as a final own position.

13 Claims, 10 Drawing Sheets

(51) Int. Cl.
*G05D 1/00* (2006.01)
*G05D 1/02* (2020.01)
(58) Field of Classification Search
CPC ..... G01S 19/426; G01S 19/40; G05D 1/0278; Y02A 90/10
See application file for complete search history.

(56) References Cited

U.S. PATENT DOCUMENTS

| | | | |
|---|---|---|---|
| 2010/0106356 A1* | 4/2010 | Trepagnier | G05D 1/0214 |
| | | | 701/25 |
| 2019/0138003 A1 | 5/2019 | Ming et al. | |
| 2019/0220035 A1* | 7/2019 | Wengreen | G06Q 10/06 |
| 2019/0377354 A1* | 12/2019 | Shalev-Shwartz | G05D 1/0257 |
| 2020/0233094 A1* | 7/2020 | Kumar | G05D 1/0278 |
| 2021/0200241 A1* | 7/2021 | Oyama | G08G 1/0112 |
| 2021/0201684 A1* | 7/2021 | Oyama | G08G 1/09675 |
| 2021/0407303 A1* | 12/2021 | Yogesha | G01W 1/10 |
| 2022/0169253 A1* | 6/2022 | Namba | G05D 1/0272 |
| 2022/0402488 A1* | 12/2022 | Fujimoto | F02D 41/021 |
| 2023/0274644 A1* | 8/2023 | Kameoka | B60W 60/0027 |

FOREIGN PATENT DOCUMENTS

| | | |
|---|---|---|
| JP | 6366357 B2 | 8/2018 |
| JP | 2019-526480 A | 9/2019 |

* cited by examiner

POSITIONING APPARATUS

INCORPORATION BY REFERENCE

The disclosure of Japanese Patent Application No. 2021-137713 filed on Aug. 26, 2021 including its specification, claims and drawings, is incorporated herein by reference in its entirety.

BACKGROUND

The present disclosure relates to a positioning apparatus.

There is an error around 10 meter in a position calculated based on the positioning information received from a plurality of positioning satellites. In order to perform high precision positioning of several centimeter order, utilization of positioning reinforcement information is necessary. Until now, the method which acquires the positioning reinforcement information by the ground channel such as the mobile phone channel (for example, FKP (Flaechen Korrektur Parameter: area correction parameter) method, network type RTK (Real-time Kinematic) method such as VRS (Virtual Reference Station: virtual base station) method) is mainly used. From now on, expansion of service using the method which acquires the positioning reinforcement information by the satellite channel such as the quasi-zenith satellite system (for example, DF-RT-PPP (Dual Frequency Real Time Precise Point Positioning) method, SSR (State Space Representation) method such as RTK-PPP method) is expected (for example, JP 6025430 B, JP 6366357 B).

SUMMARY

In the method which acquires the positioning reinforcement information by the ground channel, since only the positioning reinforcement information corresponding to the place of the receiver is transmitted, transmitted data amount of the positioning reinforcement information is small, and transmission time is short. Therefore, the positioning reinforcement information can be received in a short receiving period, and real time property is high. Accordingly, even when the sudden ionospheric storm disturbance and the like occurred and the error of positioning information of the positioning satellite was varied, the positioning reinforcement information for correcting the varied positioning error is received in the relatively short receiving period, and the accuracy of own position can be maintained. Therefore, it is preferred for the automatic driving which requires high precision position information in real time.

On the other hand, in the method which acquires the positioning reinforcement information by the satellite channel, since the positioning satellite transmits the many positioning reinforcement information collected from the many reference points which exist in the wide earth's surface area covered by the positioning satellite, data amount is large, and transmission time is long. Therefore, the positioning reinforcement information cannot be received in a short receiving period, and real time property is low. Accordingly, when the sudden ionospheric storm disturbance and the like occurred and the error of positioning information of the positioning satellite was varied, a time lag until the positioning reinforcement information for correcting the varied positioning error is received occurs, and real time property of the own position correction becomes low. In this method, since the data amount is compressed due to a restriction of the satellite channel, a number of the positioning satellites which become objects for reinforcement may become less than the method which uses the ground channel. And, since the wide earth's surface area covered by the satellite is divided into a plurality of large areas, and the positioning reinforcement information for every area is transmitted, an accuracy of the positioning reinforcement information may be inferior to the method which uses the ground channel. Therefore, there is a problem for the automatic driving which require high precision position information in real time.

Then, the purpose of the present disclosure is to provide a positioning apparatus which can reduce the error of the positioning information of the positioning satellite, by using either appropriate one of the positioning reinforcement information by the ground channel or the positioning reinforcement information by the satellite channel, according to execution state of the automatic driving.

A positioning apparatus according to the present disclosure, including:

a satellite positioning information reception unit that receives positioning information from positioning satellites;

a ground reinforcement information reception unit that receives positioning reinforcement information from a ground base station;

a first own position calculation unit that calculates a first own position, based on the positioning information and the positioning reinforcement information of the ground base station;

a satellite reinforcement information reception unit that receives positioning reinforcement information from the positioning satellite;

a second own position calculation unit that calculates a second own position based on the positioning information and the positioning reinforcement information of the satellite;

a driving mode reception unit that receives a driving mode signal which indicates whether or not a driving mode of an own vehicle is an automatic driving mode, from an automatic driving apparatus of the own vehicle which is an arithmetic object of an own position;

an own position selection unit that determines either the first own position or the second own position to be used, based on the driving mode; and an own position output unit that outputs the first own position or the second own position which is determined to be used by the own position selection unit, as a final own position.

According to the positioning apparatus of the present disclosure, either appropriate one of the first own position using the positioning reinforcement information of the ground base station, or the second own position using the positioning reinforcement information of the positioning satellite is determined to be used, based on whether or not it is the automatic driving mode, and the final own position suitable for the driving mode can be calculated.

DETAILED DESCRIPTION OF THE EMBODIMENTS

1. Embodiment 1

Figure 1:
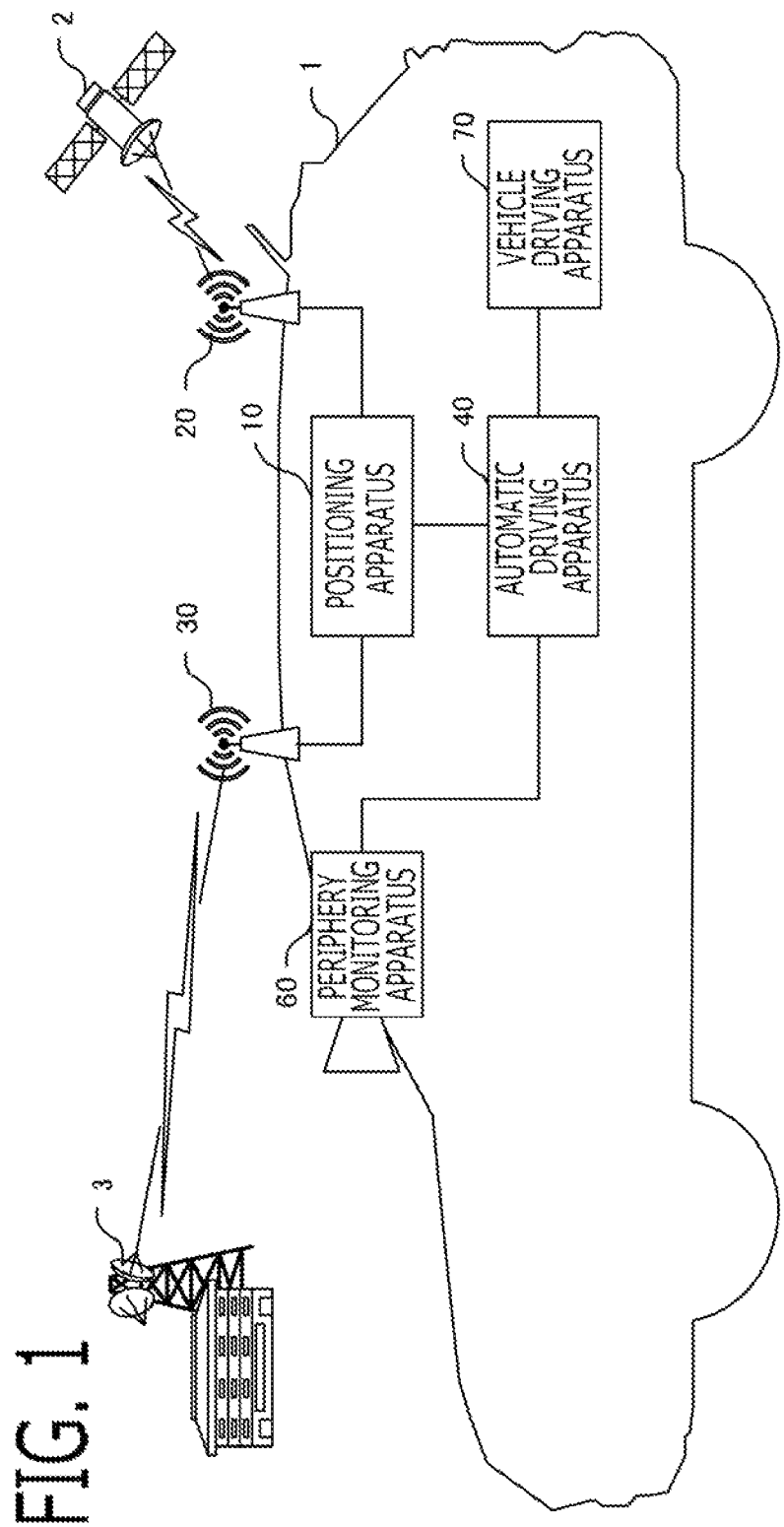
FIG. 1 is a schematic configuration diagram of the positioning apparatus and the automatic driving apparatus according to Embodiment 1.

A positioning apparatus 10 according to Embodiment 1 will be explained with reference to drawings. As shown in FIG. 1, the positioning apparatus 10 is mounted on a vehicle 1 (hereinafter, referred to as an own vehicle 1), and detects a position (hereinafter, referred to as an own position) of the own vehicle 1. The own vehicle 1 is provided with the positioning apparatus 10, a satellite channel antenna 20, a ground channel antenna 30, an automatic driving apparatus 40, a periphery monitoring apparatus 60, a vehicle driving apparatus 70, and the like. Each apparatus performs data communication mutually.

The periphery monitoring apparatus 60 is apparatus which monitors the periphery of the vehicle, such as a camera and a radar. As the radar, a millimeter wave radar, a laser radar, an ultrasonic radar, and the like are used.

As the vehicle driving apparatus 70, a power apparatus, a braking apparatus, an automatic steering apparatus, a light apparatus, and the like are provided. The vehicle driving apparatus 70 drives the vehicle, based on a target vehicle driving amount transmitted from the automatic driving apparatus 40, when driving automatically; and drives the vehicle, based on an operating amount of the driver, when not driving automatically. The power apparatus is provided with a power machine, such as an internal combustion engine or a motor which drives wheels, and changes output of the power machine based on an output command of the automatic driving apparatus 40, or an output operating amount of the driver. The braking apparatus is provided with an electric brake apparatus, and changes a braking force of the brake, based on a brake command of the automatic driving apparatus 40, or a brake operating amount of the driver. The automatic steering apparatus is provided with an electric steering apparatus, and changes a steering angle, based on a steering angle command of the automatic driving apparatus 40, or a steering operation amount of the driver. The light apparatus is provided with a direction indicator and the like, and controls a light based on a light command of the automatic driving apparatus 40, or a light operation amount of the driver.

The automatic driving apparatus 40 is an apparatus which drives automatically based on the own position detected by the positioning apparatus 10, and various kinds of well-known methods are used. For example, the automatic driving apparatus 40 acquires an own position from the positioning apparatus 10; detects a traveling state of the own vehicle based on various kinds of acceleration sensors and velocity sensors; and detects a peripheral condition (other vehicle, obstacle, lane, and the like) of the own vehicle based on the detection information of the periphery monitoring apparatus 60. The automatic driving apparatus 40 calculates a target traveling route to a target point, based on the own position, the target point, and map data; and acquires road information around the own vehicle and along the target traveling route, from the map data, based on the own position and the target traveling route.

The automatic driving apparatus 40 determines whether a driving mode is an automatic driving mode in which an automatic driving is performed, or it is a manual driving mode in which a driving by a driver is performed, based on operation of the driver and the like. The automatic driving apparatus 40 transmits a driving mode signal which indicates whether or not the driving mode is the automatic driving mode, to the positioning apparatus 10.

The automatic driving apparatus 40 can perform the automatic driving of an automatic driving level of level 1 or more. When performing the automatic driving, the automatic driving apparatus 40 calculates a target vehicle driving amount, based on the own position received from the positioning apparatus 10, the traveling state, the peripheral condition, the road information, the target traveling route, and the like, and transmits it to the vehicle driving apparatus 70. Any one or more of an output command of the power machine, a brake command of the brake, a steering angle command, and a light command are included in the target vehicle driving amount.

When performing the automatic driving of the automatic driving level of level 3 or more, the automatic driving apparatus 40 calculates a target traveling track, based on the own position received from the positioning apparatus 10, the traveling state, the peripheral condition, the road information, the target traveling route, and the like; and calculates the target vehicle driving amount for the own vehicle to follow the target traveling track, based on the own position received from the positioning apparatus 10, the traveling state, the target traveling track, and the like, and transmits it to the vehicle driving apparatus 70.

1-1. Positioning Apparatus 10

Figure 2:
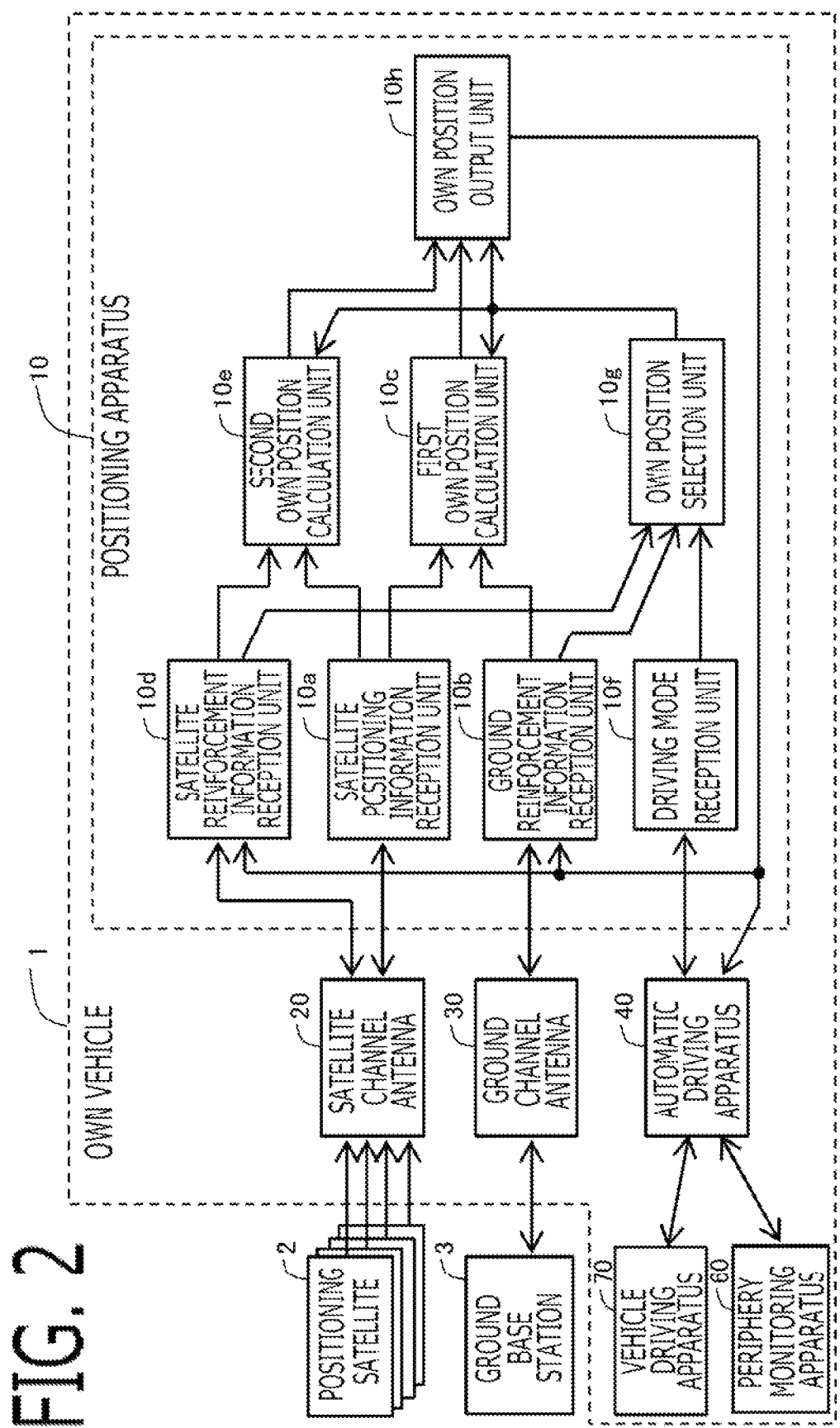
FIG. 2 is a schematic block diagram of the positioning apparatus according to Embodiment 1.
Figure 3:
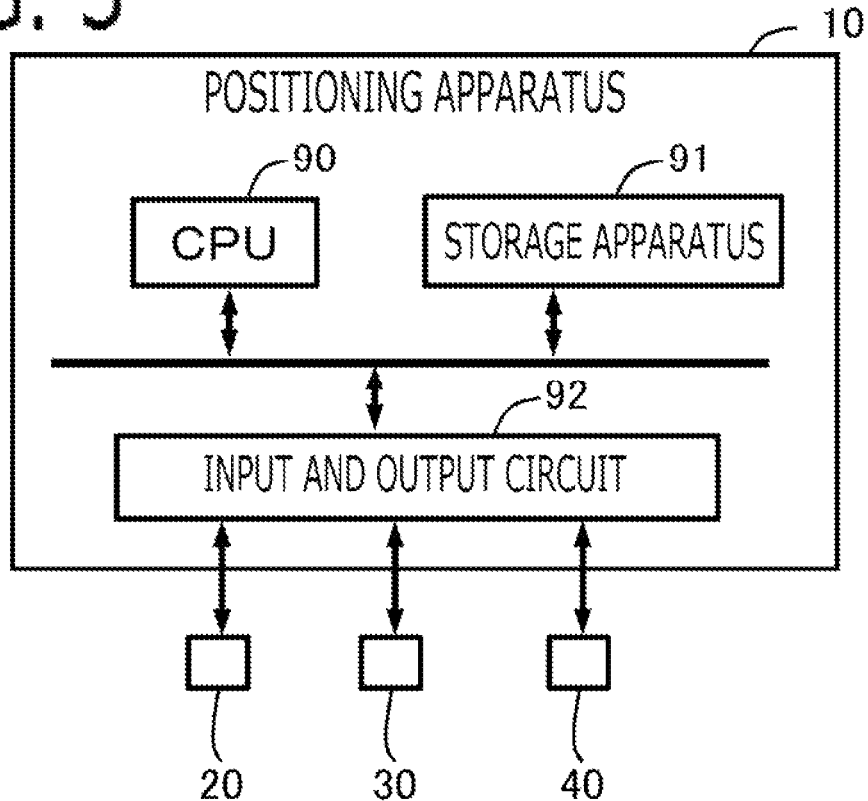
FIG. 3 is a schematic hardware configuration diagram of the positioning apparatus according to Embodiment 1.

As shown in FIG. 2, the positioning apparatus 10 is provided with functional units, such as a satellite positioning information reception unit 10a, a ground reinforcement information reception unit 10b, a first own position calculation unit 10c, a satellite reinforcement information reception unit 10d, a second own position calculation unit 10e, a driving mode reception unit 10f, an own position selection unit 10g, and an own position output unit 10h. Each function of the positioning apparatus 10 is realized by processing circuits provided in the positioning apparatus 10. As shown in FIG. 3, specifically, the positioning apparatus 10 is provided with an arithmetic processor 90 such as CPU (Central Processing Unit), storage apparatuses 91, an input and output circuit 92 which outputs and inputs external signals to the arithmetic 90, and the like.

As the arithmetic processor 90, ASIC (Application Specific Integrated Circuit), IC (Integrated Circuit), DSP (Digital Signal Processor), FPGA (Field Programmable Gate Array), GPU (Graphics Processing Unit), AI (Artificial Intelligence) chip, various kinds of logical circuits, various kinds of signal processing circuits, and the like may be provided. As the arithmetic processor 90, a plurality of the same type ones or the different type ones may be provided, and each processing may be shared and executed. As the storage apparatuses 91, various kinds of storage apparatus, such as RAM (Random Access Memory), ROM (Read Only Memory), a flash memory, EEPROM (Electrically Erasable Programmable Read Only Memory), a hard disk, and a DVD apparatus, are used.

The input and output circuit 92 is provided with a communication device, an A/D converter, an input/output port, a driving circuit, and the like. The input and output circuit 92 is connected to the satellite channel antenna 20, the ground channel antenna 30, the automatic driving apparatus 40, and the like, and communicates with these apparatuses.

Then, the arithmetic processor 90 runs software items (programs) stored in the storage apparatus 91 and collaborates with other hardware devices in the positioning apparatus 10, such as the storage apparatus 91, and the input and output circuit 92, so that the respective functions of the functional units 10*a* to 10*h* included in the positioning apparatus 10 are realized. Setting data items such as a determination value to be utilized in the functional units 10*a* to 10*h* are stored, as part of software items (programs), in the storage apparatus 91 such as a ROM.

Figure 4:
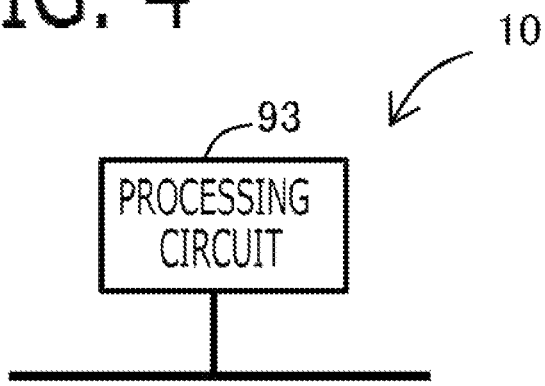
FIG. 4 is another example of schematic hardware configuration diagram of the positioning apparatus according to Embodiment 1.

Alternatively, as shown in FIG. 4, the positioning apparatus 10 may be provided with a dedicated hardware 93 as the processing circuit, for example, a single circuit, a combined circuit, a programmed processor, a parallel programmed processor, ASIC, FPGA, GPU, AI chip, or a circuit which combined these. The positioning apparatus 10 may be integrally configured with the automatic driving apparatus 40. Each function of the positioning apparatus 10 will be explained in detail below.

1-1-1. Satellite Positioning Information and Positioning Reinforcement Information Many positioning satellites 2 are provided so that surface of the earth can be covered. Each positioning satellite 2 transmits positioning information. The positioning satellites 2 are satellites of GNSS (Global Navigation Satellite System) and the like.

There is an error around 10 m in a position calculated based on the positioning information received from a plurality of positioning satellites 2 at each point. A positioning reinforcement information for reducing the position error is transmitted from the positioning satellite 2 and the ground base station 3. Reference points where the high precision position is measured previously are dispersedly provided so that a service providing area can be covered. At each reference point, the positioning reinforcement information for reducing the error included in the received positioning information of each positioning satellite 2 is calculated based on the position of the reference point. By reinforcing the positioning information of each positioning satellite 2 using this positioning reinforcement information, the high precision position of several centimeter order can be obtained.

Then, a satellite base station collects positioning reinforcement information from many reference points which exist in a wide earth's surface area which is covered by the positioning satellite 2 which transmits the positioning reinforcement information; and transmits the collected positioning reinforcement information of the many reference points, to the positioning satellite 2. The positioning satellite 2 transmits the positioning reinforcement information of the many reference points toward the earth's surface. Therefore, a data amount of the positioning reinforcement information transmitted by the positioning satellite 2 is large. In this method, since the data amount is compressed due to a restriction of the satellite channel, a number of the positioning satellites which become objects for reinforcement may become less than the method which uses the ground channel. And, since the wide earth's surface area covered by the positioning satellite is divided into a plurality of large areas, and the positioning reinforcement information for every area is transmitted, an accuracy of the positioning reinforcement information may be inferior to the method which uses the ground channel. The positioning satellite 2 which transmits the positioning reinforcement information may be different from the positioning satellites which transmit the positioning information, for example, may be a quasi-zenith satellite or a circular orbit satellite.

On the other hand, each ground base station 3 acquires positioning reinforcement information from near one or a plurality of reference points, and transmits the acquired positioning reinforcement information of the few reference points into a communications area. Therefore, a data amount of the positioning reinforcement information transmitted by the ground base station 3 is small.

1-1-2. Satellite Positioning Information Reception Unit 10*a*

The satellite positioning information reception unit 10*a* receives positioning information from the positioning satellites 2 via the satellite channel antenna 20. Although it is simplified to the one positioning satellite 2 is simplified in FIG. 1, the positioning information are actually received from a plurality of receivable positioning satellites 2. For positioning, the positioning information are received at the same time from at least four or more positioning satellites 2.

1-1-3. Ground Reinforcement Information Reception Unit 10*b*

The ground reinforcement information reception unit 10*b* receives positioning reinforcement information (hereinafter, referred to as positioning reinforcement information of the ground base station) from the ground base station 3 via the ground channel antenna 30. The ground reinforcement information reception unit 10*b* communicates with the near ground base station 3, and receives positioning reinforcement information. A receiving period of the positioning reinforcement information of the ground base station is shorter than a receiving period of the positioning reinforcement information of the satellite described below, for example, is less than 1 second.

For example, the ground base station 3 is a base station of a mobile phone channel. The wireless communication standards of the cellular communication system such as 4G and 5G are used. The ground base stations 3 are dispersedly disposed so that a service providing area can be covered. As mentioned above, each ground base station 3 acquires positioning reinforcement information from near one or a plurality of reference points, and transmits the acquired positioning reinforcement information of the few reference points into a communications area. Therefore, a data amount of the positioning reinforcement information transmitted by the ground base station 3 is small. Therefore, the ground reinforcement information reception unit 10*b* can shorten the receiving period, and can acquire positioning reinforcement information from the ground base station 3 for every relatively short receiving period. A real time property becomes high, and it is preferred for the automatic driving which requires high precision position information in real time.

1-1-4. First Own Position Calculation Unit 10*c*

The first own position calculation unit 10*c* calculates a first own position, based on the positioning information and the positioning reinforcement information of the ground base station. The first own position calculation unit 10*c* does not calculate the first own position, when one or both of positioning information and the positioning reinforcement information of the ground base station cannot be received.

Specifically, at every time when receiving the positioning information, the first own position calculation unit 10c calculates the first own position in which the error of positioning information was corrected by the positioning reinforcement information of the ground base station, based on the positioning information of a plurality of positioning satellites 2 received by the satellite positioning information reception unit 10a, and the newest positioning reinforcement information of the ground base station received by the ground reinforcement information reception unit 10b.

The positioning reinforcement information of the ground base station is positioning reinforcement information calculated by the near reference point, and it can be used for correction of the own position. Since the first own position calculation unit 10c corrects the own position using the positioning reinforcement information of the ground base station received at every relatively short receiving period, the high precision first own position with high real time property to variation of positioning error can be calculated. Therefore, even when the sudden ionospheric storm disturbance and the like occurred and the error of positioning information was varied, the positioning reinforcement information for correcting the varied positioning error is received in the relatively short receiving period, and the accuracy of the first own position can be maintained.

1-1-5. Satellite Reinforcement Information Reception Unit 10d

The satellite reinforcement information reception unit 10d receives positioning reinforcement information (hereinafter, referred to as positioning reinforcement information of the satellite) from the positioning satellite 2 via the satellite channel antenna 20. The ground reinforcement information reception unit 10b receives positioning reinforcement information from the one positioning satellite 2 which transmits positioning reinforcement information. The receiving period of positioning reinforcement information of the satellite is longer than the receiving period of positioning reinforcement information of the ground base station.

As mentioned above, since the positioning satellite 2 transmits the many positioning reinforcement information collected from the many reference points which exist in the wide earth's surface area covered by the positioning satellite 2, data amount is large. Therefore, the satellite reinforcement information reception unit 10d cannot shorten the receiving period, but acquires the positioning reinforcement information of many reference points at every relatively long receiving period. Therefore, a real time property becomes low, and there is a problem for the automatic driving which require high precision position information in real time.

1-1-6. Second Own Position Calculation Unit 10e

The second own position calculation unit 10e calculates a second own position based on the positioning information and the positioning reinforcement information of the satellite. The second own position calculation unit 10e does not calculate the second own position, when one or both of the positioning information and the positioning reinforcement information of the satellite cannot be received.

Specifically, at every time when receiving the positioning reinforcement information of the satellite, the second own position calculation unit 10e extracts positioning reinforcement information corresponding to a reference point close to the own position, from the positioning reinforcement information of the satellite which includes the positioning reinforcement information of many reference points. And, at every calculation period of the own position, the second own position calculation unit 10e calculates the second own position in which the error of positioning information was corrected by the positioning reinforcement information of the satellite, based on the newest positioning information of a plurality of positioning satellites 2 received by the satellite positioning information reception unit 10a, and the extracted positioning reinforcement information corresponding to the reference point close to the newest own position.

Since the second own position calculation unit 10e corrects the own position using the positioning reinforcement information of the satellite acquired at every relatively long receiving period, the high precision second own position with low real time property to variation of positioning error is calculated. Therefore, when the sudden ionospheric storm disturbance and the like occurred and the error of positioning information is varied, since the positioning reinforcement information for correcting the varied positioning error is received in the relatively long receiving period, the accuracy of the second own position is deteriorated temporarily.

1-1-7. Driving Mode Reception Unit 10f

The driving mode reception unit 10f receives a driving mode signal which indicates whether or not a driving mode of the own vehicle is the automatic driving mode, from the automatic driving apparatus 40 of the own vehicle which is an arithmetic object of an own position.

1-1-8. Own Position Selection Unit 10g and Own Position Output Unit 10h

The own position selection unit 10g determines either the first own position or the second own position to be used, based on the driving mode. The own position output unit 10h outputs the first own position or the second own position which is determined to be used by the own position selection unit 10g, as a final own position. The final own position is transmitted to the automatic driving apparatus 40.

According to this configuration, either appropriate one of the first own position or the second own position is determined to be used, based on whether or not it is the automatic driving mode, and the final own position suitable for the driving mode can be calculated.

When the positioning reinforcement information of the ground base station can be received and the positioning reinforcement information of the satellite cannot be received, the own position selection unit 10g determines to use the first own position. When the positioning reinforcement information of the ground base station cannot be received and the positioning reinforcement information of the satellite can be received, the own position selection unit 10g determines to use the second own position. In the present embodiment, explanation is given on assumption that both of the positioning reinforcement information of the ground base station and the positioning reinforcement information of the satellite can be received.

In the present embodiment, when the driving mode is the automatic driving mode, the own position selection unit 10g selects the first own position, and outputs it as the final own position. When the driving mode is not the automatic driving mode (when it is the manual driving mode in this example), the own position selection unit 10g selects the second own position, and outputs it as the final own position.

According to this configuration, when it is the automatic driving mode, since the first own position calculated based on the positioning reinforcement information of the ground base station with high real time property is selected, the own position suitable for the automatic driving which requires high precision position information in real time can be calculated. On the other hand, when it is not the automatic driving mode, since the second own position calculated based on the positioning reinforcement information of the satellite with low real time property is selected, the own position suitable for the manual driving which does not require real time property can be calculated.

1-1-9. Flowchart

Figure 5:
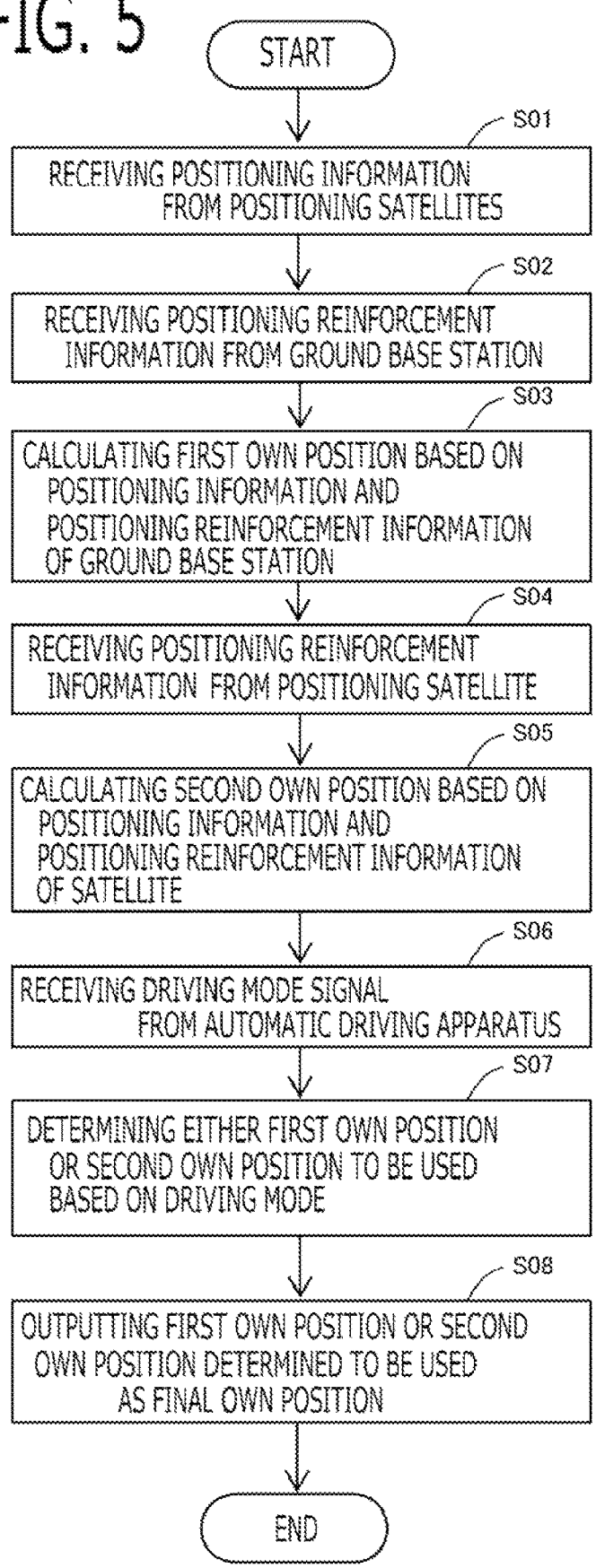
FIG. 5 is a flowchart for explaining processing of the positioning apparatus according to Embodiment 1.

The foregoing processing of the positioning apparatus 10 can be configured as shown in the flowchart of FIG. 5. Although FIG. 5 shows in the order of steps for convenience, processing of each step is executed at processing timing of each step in turn.

In the step S01, as mentioned above, the satellite positioning information reception unit 10a receives positioning information from the positioning satellites 2 via the satellite channel antenna 20. The reception processing of the positioning information is performed at every predetermined receiving period.

In the step S02, as mentioned above, the ground reinforcement information reception unit 10b receives the positioning reinforcement information of the ground base station from the ground base station 3 via the ground channel antenna 30. The reception processing of the positioning reinforcement information of the ground base station is performed at every predetermined receiving period. The receiving period of the positioning reinforcement information of the ground base station is shorter than the receiving period of the positioning reinforcement information of the satellite.

In the step S03, as mentioned above, the first own position calculation unit 10c calculates a first own position based on the positioning information and the positioning reinforcement information of the ground base station. The calculation processing of the first own position is performed at every reception of the positioning information, for example, and the newest positioning reinforcement information of the ground base station is used.

In the step S04, as mentioned above, the satellite reinforcement information reception unit 10d receives the positioning reinforcement information of the satellite from the positioning satellite 2 via the satellite channel antenna 20. The reception processing of the positioning reinforcement information of the satellite is performed at every predetermined receiving period. The receiving period of positioning reinforcement information of the satellite is longer than the receiving period of positioning reinforcement information of the ground base station.

In the step S05, as mentioned above, the second own position calculation unit 10e calculates a second own position based on the positioning information and the positioning reinforcement information of the satellite. The calculation processing of the second own position is performed at every reception of the positioning information, for example, and the newest positioning reinforcement information of the satellite is used.

In the step S06, as mentioned above, the driving mode reception unit 10f receives a driving mode signal which indicates whether or not a driving mode of the own vehicle is the automatic driving mode, from the automatic driving apparatus 40 of the own vehicle which is an arithmetic object of an own position. The reception processing of the driving mode signal is performed at every predetermined receiving period, and the receiving period does not need to be a high speed.

In the step S07, as mentioned above, the own position selection unit 10g determines either the first own position or the second own position to be used, based on the driving mode. The determination processing is performed at every predetermined calculation period, and the calculation period does not need to be a high speed.

In the step S08, as mentioned above, the own position output unit 10h outputs the first own position or the second own position which is determined to be used by the own position selection unit 10g, as a final own position. The final own position is transmitted to the automatic driving apparatus 40. The output processing is performed at every calculation period of the first own position or the second own position.

2. Embodiment 2

Figure 6:
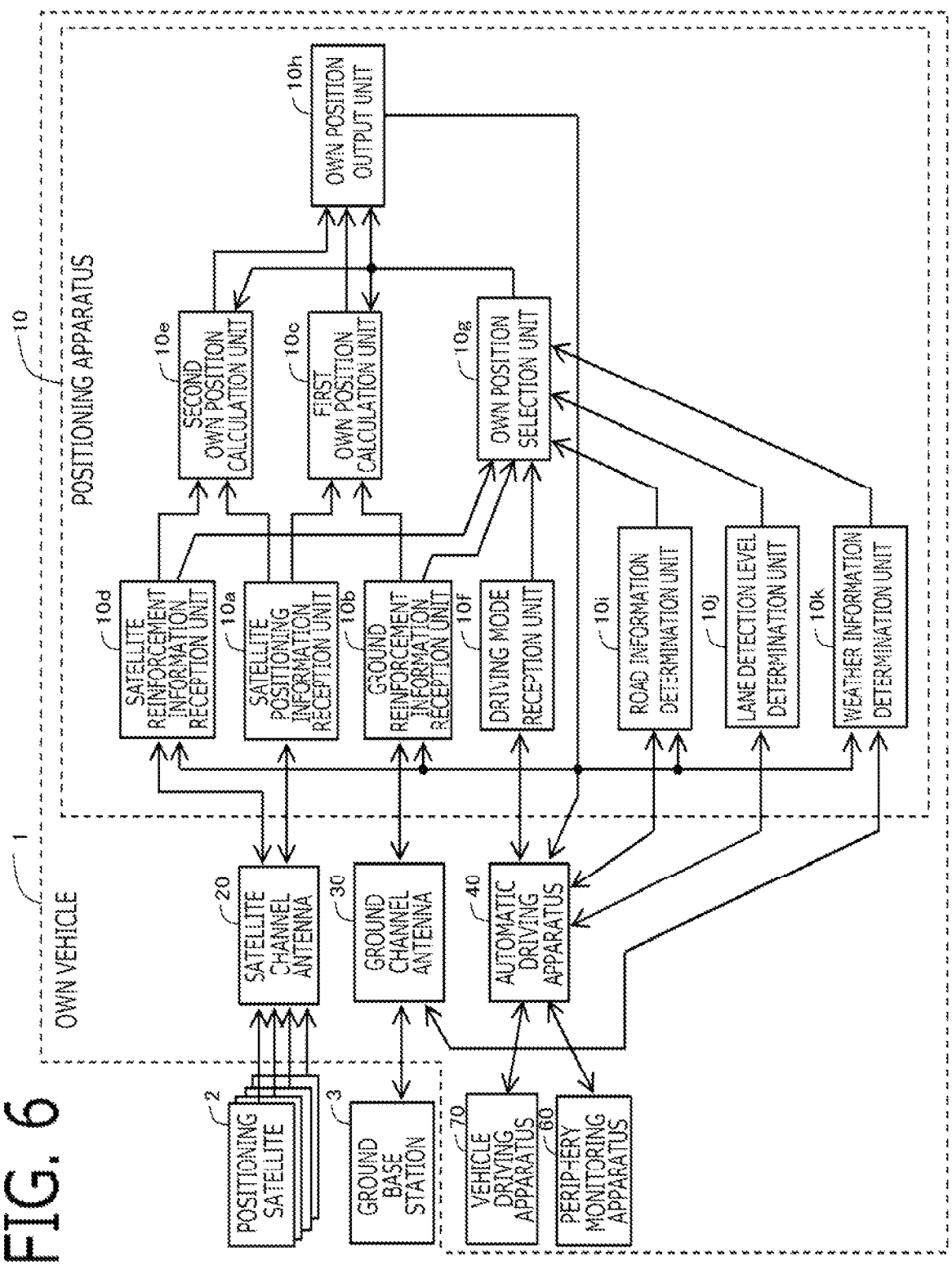
FIG. 6 is a schematic block diagram of the positioning apparatus according to Embodiment 2.

Next, the positioning apparatus 10 according to Embodiment 2 will be explained. The explanation for constituent parts the same as those in Embodiment 1 will be omitted. The basic configuration of the positioning apparatus 10, the automatic driving apparatus 40 and the like according to the present embodiment is the same as that of Embodiment 1. It is different from Embodiment 1 in that the positioning apparatus 10 is provided further with a road information determination unit 10i, a lane detection level determination unit 10j, and a weather information determination unit 10k as shown in FIG. 6.

2-1. Road Information Determination Unit 10i

The road information determination unit 10i acquires one or both (in this example, both) of road information around the own vehicle, and road information along the target traveling route of the own vehicle, from map data; determines either the first own position or the second own position to be used, based on the acquired road information; and outputs a determination result as a road information determination result.

Then, when the driving mode is the automatic driving mode, the own position selection unit 10g determines either the first own position or the second own position to be used, based on the road information determination result. And, when the driving mode is not the automatic driving mode, the own position selection unit 10g determines to use the second own position.

When performing the automatic driving, the required real time property of the positioning reinforcement information changes according to road condition. According to this configuration, when it is the automatic driving mode, according to the required real time property of position information which changes according to the road information, it can be determined appropriately either the first own position or the second own position to be used, and the appropriate own position can be calculated. If the road information on the target traveling route of the own vehicle is used, the automatic driving is performed using the appropriate own position before each point on the target traveling route. A rapid vehicle operation can be prevented from being performed at each point.

The road information determination unit 10i may acquire the road information from the map data stored in the storage apparatus in the own vehicle such as the automatic driving apparatus 40 or the positioning apparatus 10, or may acquire the road information from the map data stored in the server outside the own vehicle via the ground channel antenna 30. In this example, the map data stored in the storage apparatus of the automatic driving apparatus 40 is used.

For example, when the target traveling route is longer than a determination object distance, the road information determination unit 10i extracts a determination object section from the current position to the determination object distance ahead, from the target traveling route. When the target traveling route is shorter than the determination object distance, the road information determination unit 10i sets all the target traveling route as the determination object section. The determination object distance is set so that the previous preparation section may not become long unnecessarily. The determination object distance may be increased as the vehicle speed increases. The road information determination unit 10i acquires the road information of each point of the determination object section of the target traveling route, from the map data; and determines either the first own position or the second own position to be used, based on the road information of each point of the determination object section. The road information determination unit 10i acquires the road information of the current position of the own vehicle from map data; and determines either the first own position or the second own position to be used, based on the acquired road information of the current position.

<Determination by Lane Width>

In the present embodiment, the road information determination unit 10i acquires one or both (in this example, both) of a lane width of a traveling lane where the own vehicle is traveling, and a lane width of a traveling lane on the target traveling route, as the road information, from the map data; and determines to use the first own position, when the acquired lane width is smaller than a determination width. When the acquired lane width is not smaller than the determination width, the road information determination unit 10i determines to use the second own position for the determination by the lane width.

When the lane width is narrow, the required real time property of the positioning reinforcement information becomes high in order to make the own vehicle travel within the lane by the automatic driving with good accuracy. According to this configuration, when the lane width is smaller than the determination width, it is determined to use the first own position with the high real time property of the positioning reinforcement information, the position control accuracy of the automatic driving can be improved, and the own vehicle can be made to travel within the lane with good accuracy. If the lane width of the traveling lane along the target traveling route of the own vehicle is used, when the front lane width becomes narrower than the determination width, the position control accuracy of the own vehicle is improved beforehand using the first own position, and a rapid vehicle operation can be prevented from being performed when the lane width becomes small.

The road information determination unit 10i may acquire information on design standard of the traveling lane from map data, and may determine the lane width based on the information on design standard. Since the design standard of road is different for every country or area, information on the design standard corresponding to the country or the area of the current position is used.

The road information determination unit 10i acquires the lane width of each point of the determination object section of the target traveling route, determines the minimum lane width among the acquired lane widths of each point; and determines to use the first own position, when the minimum lane width is smaller than the determination width. And, the road information determination unit 10i acquires the lane width of the traveling lane of the current position of the own vehicle; and determines to use the first own position, when the acquired lane width is smaller than the determination width.

On the other hand, when the minimum lane width of the determination object section of the target traveling route is larger than the determination width and the lane width of the traveling lane of the current position is larger than the determination width, the road information determination unit 10i determines to use the second own position for the determination by the lane width.

<Determination by Curvature>

In the present embodiment, the road information determination unit 10i acquires, as the road information, one or both (in this example, both) of the curvature of the traveling lane where the own vehicle is traveling, and the curvature of the traveling lane on the target traveling route, from map data, and determines to use the first own position, when the acquired curvature is larger than a determination curvature. When the acquired curvature is not larger than the determination curvature, the road information determination unit 10i determines to use the second own position for the determination by the curvature.

When the curvature is large, the required real time property of the positioning reinforcement information becomes high in order to make the own vehicle travel along the traveling lane where the curvature is large, by the automatic driving, with good accuracy. According to this configuration, when the curvature is larger than the determination curvature, it is determined to use the first own position with the high real time property of the positioning reinforcement information, the position control accuracy of the automatic driving is improved, and the own vehicle can be made to travel along the traveling lane where the curvature is large, with good accuracy. If the curvature of the traveling lane along the target traveling route of the own vehicle is used, when the front curvature becomes larger than the determination curvature, the position control accuracy of the own vehicle is improved beforehand using the first own position, and a rapid vehicle operation can be prevented from being performed when the curvature becomes large.

The road information determination unit 10i may acquires information on design standard of the road, from map data, and may determine the curvature, based on the information on design standard.

The road information determination unit 10i acquires the curvature of each point of the determination object section of the target traveling route; determines the maximum curvature among the acquired curvatures of each point; and determines to use the first own position, when the maximum curvature is larger than the determination curvature. And, the road information determination unit 10i acquires the curvature of the traveling lane of the current position of the own vehicle; and determines to use the first own position, when the acquired curvature is larger than the determination curvature.

On the other hand, when the maximum curvature of the determination object section of the target traveling route is smaller than the determination curvature and the curvature of the traveling lane of the current position is smaller than the determination curvature, the road information determination unit 10i determines to use the second own position for the determination by the curvature.

<Determination Using Information on Road Structure of Traveling Lane>

In the present embodiment, the road information determination unit 10i acquires, as road information, one or both (in this example, both) of information on road structure of the traveling lane where the own vehicle is traveling, and information on road structure of the traveling lane on the target traveling route, from map data; and determines to use the first own position, when the acquired road structure is a road structure in which a positioning accuracy on a basis of the positioning information becomes low, or a road structure in which a high position control accuracy is required. When the acquired road structure is not the road structure in which the positioning accuracy on the basis of the positioning information becomes low, and is not the road structure in which the high position control accuracy is required, the road information determination unit 10i determines to use the second own position for determination by the road structure of the traveling lane.

When the acquired road structure is the road structure in which the positioning accuracy becomes low, the positioning accuracy by the positioning information of the positioning satellites becomes low. When the acquired road structure is the road structure in which the high position control accuracy is required, since the automatic driving of high position control accuracy is required, the required real time property of the positioning reinforcement information becomes high. According to this configuration, when the acquired road structure is the road structure in which the positioning accuracy becomes low, or the road structure in which the high position control accuracy is required, it is determined to use the first own position with the high real time property of the positioning reinforcement information, and the position control accuracy of the automatic driving can be improved.

In the present embodiment, the road information determination unit 10i acquires one or both (in this example, both) of information on crossing structure of the traveling lane, and information on structure of the traveling lane, as information on the road structure of the traveling lane.

The acquired crossing structure includes information on level crossing structure of roads, information on grade separated crossing structure of roads, information on level crossing structure (for example, railroad crossing) between road and railroad, information on grade separated crossing structure between road and other structure (for example, elevated bridge), and the like. The crossing structure in which the positioning accuracy becomes low is a crossing structure in which the traveling lane of the own vehicle becomes under other structure, and the radio wave of the positioning satellite 2 is easy to be interrupted. For example, it is the grade separated crossing structure of roads, the grade separated crossing structure between road and other structure, and the like.

The acquired information on the structure of the traveling lane includes tunnel, bridge, refuge place, traffic island (such as tram station of tram-train), car parking places (such as bus station, emergency parking area), and the like. The structure of the traveling lane in which the positioning accuracy becomes low is a structure in which a structure exists above the traveling lane of the own vehicle, and the radio wave of the positioning satellite 2 is easy to be interrupted. For example, it is the tunnel, down side stage of multi-stage bridge, and the like. The structure of the traveling lane in which the high position control accuracy is required is a road structure in which the high position control accuracy is required in order to avoid contact with surrounding vehicle, person, structure, and the like. For example, it is the refuge place, the traffic island, the car parking place, and the like.

The road information determination unit 10i determines whether or not the road structure (in this example, the crossing structure, the structure of the traveling lane) of the traveling lane of each point of the determination object section of the target traveling route extracted as mentioned above is the road structure in which the positioning accuracy on the basis of the positioning information becomes low, or the road structure in which the high position control accuracy is required. When there is a point which is the road structure in which the positioning accuracy becomes low, or the road structure in which the high position control accuracy is required, the road information determination unit 10i determines to use the first own position. The road information determination unit 10i acquires the road structure of the traveling lane of the current position of the own vehicle; and determines to use the first own position, when the acquired road structure is the road structure in which the positioning accuracy on the basis of the positioning information becomes low, or the road structure in which the high position control accuracy is required.

On the other hand, when there is no point which is the road structure in which the positioning accuracy becomes low or the road structure in which the high position control accuracy is required, in the road structure of the traveling lane of each point of the determination object section of the target traveling route, and the road structure of the traveling lane of the current position is not the road structure in which the positioning accuracy becomes low and is not the road structure in which the high position control accuracy is required, the road information determination unit 10i determines to use the second own position, for determination by the road structure of the traveling lane.

<Overall Determination by Various Kinds of Road Information>

As mentioned above, when it is determined to use the first own position for any one or more of the plural kinds of the road information (in this example, the lane width, the curvature, and the road structure of the traveling lane), the road information determination unit 10i outputs the road information determination result which is determined to use the first own position. On the other hand, when it is not determined to use the first own position for any one of the plural kinds of the road information, the road information determination unit 10i outputs the road information determination result which is determined to use the second own position.

<Flowchart of Road Information Determination Unit 10i>

Figure 7:
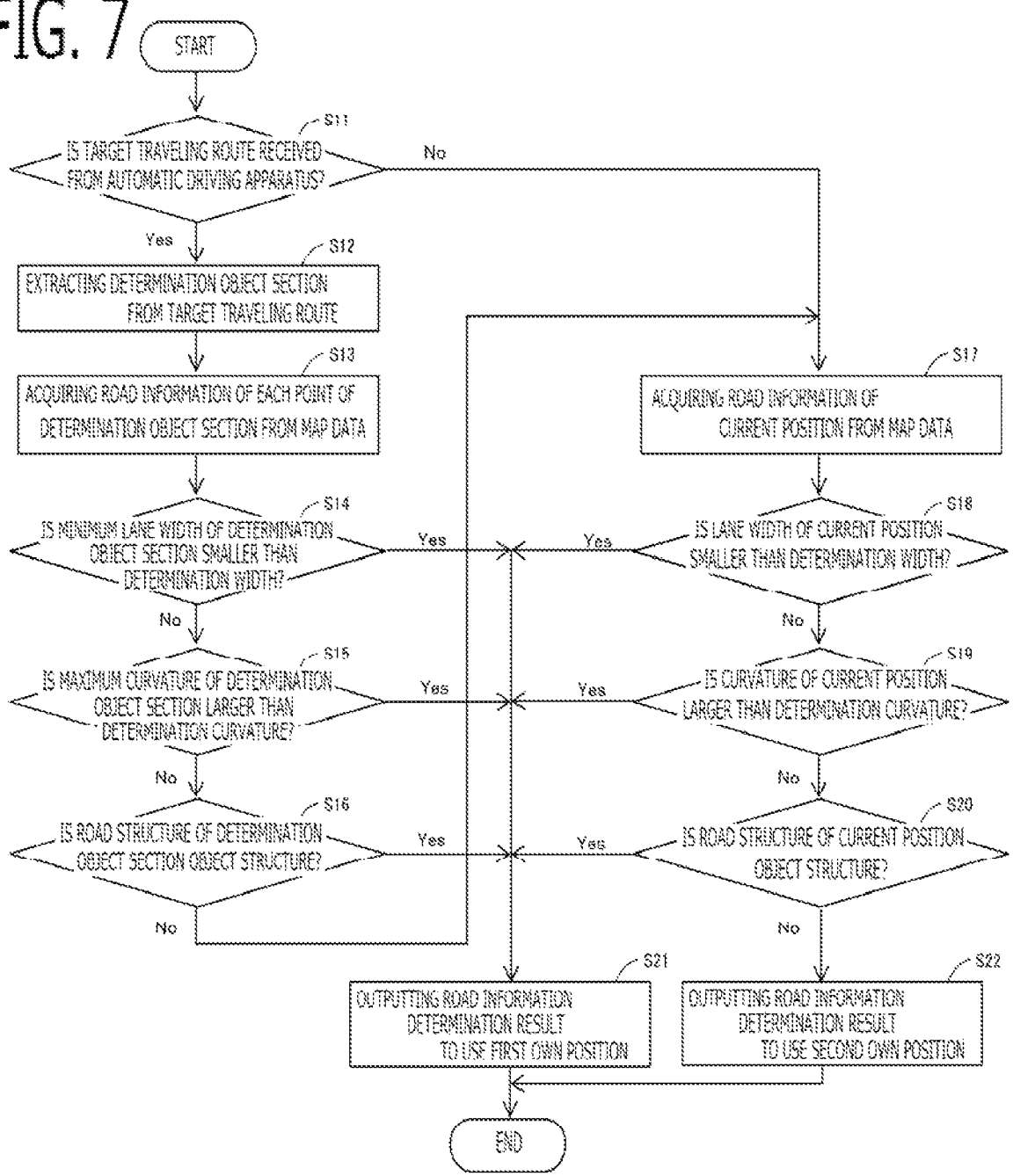
FIG. 7 is a flowchart for explaining processing of the road information determination unit according to Embodiment 2.

The above processing of the road information determination unit 10i can be configured as shown in the flowchart of FIG. 7. Processing of the flowchart of FIG. 7 is executed at every predetermined calculation period.

First, in the step S11, the road information determination unit 10i performs a reception processing which receives the target traveling route from the automatic driving apparatus 40. It advances to the step S12, when it can be received, and it advances to the step S17, when it cannot be received.

In the step S12, as mentioned above, the road information determination unit 10i extracts the determination object section from the current position to the determination object distance ahead, from the target traveling route. Then, in the step S13, as mentioned above, the road information determination unit 10i acquires the road information (in this example, the lane width, the curvature, and the road structure of the traveling lane) of each point of the determination object section of the target traveling route, from map data.

Then, in the step S14, as mentioned above, the road information determination unit 10i determines the minimum lane width among the acquired lane widths of each point of the determination object section of the target traveling route; and determines whether or not the minimum lane width is smaller than the determination width. It advances to the step S21 and determines to use the first own position, when the minimum lane width is smaller than the determination width; and it advances to the step S15, when the minimum lane width is not smaller than the determination width.

In the step S15, as mentioned above, the road information determination unit 10*i* determines the maximum curvature among the acquired curvatures of each point of the determination object section of the target traveling route; and determines whether or not the maximum curvature is larger than the determination curvature. It advances to the step S21 and determines to use the first own position, when the maximum curvature is larger than the determination curvature; and it advances to the step S16, when the maximum curvature is not larger than the determination curvature, In the step S16, as mentioned above, the road information determination unit 10*i* determines whether or not the acquired road structure (in this example, the crossing structure, the structure of the traveling lane) of the traveling lane of each point of the determination object section of the target traveling route is the road structure in which the positioning accuracy on the basis of the positioning information becomes low, or the road structure in which the high position control accuracy is required. When there is a point which is the road structure in which the positioning accuracy becomes low, or the road structure in which the high position control accuracy is required, it advances to the step S21 and determines to use the first own position. When there is no point which is the road structure in which the positioning accuracy becomes low, or the road structure in which the high position control accuracy is required, it advances to the step S17.

In the step S17, as mentioned above, the road information determination unit 10*i* acquires the road information (in this example, the lane width, the curvature, and the road structure of the traveling lane) of the current position of the own vehicle, from map data.

Then, in the step S18, as mentioned above, the road information determination unit 10*i* determines whether or not the lane width of the traveling lane of the current position of the own vehicle is smaller than the determination width. It advances to the step S21 and determines to use the first own position, when it is smaller than the determination width; and it advances to the step S19, when it is not smaller than the determination width.

In the step S19, as mentioned above, the road information determination unit 10*i* determines whether or not the curvature of the traveling lane of the current position of the own vehicle is larger than the determination curvature. It advances to the step S21 and determines to use the first own position, when it is larger than the determination curvature; and it advances to the step S20, when it is not larger than the determination curvature.

In the step S20, as mentioned above, the road information determination unit 10*i* determines whether or not the road structure (in this example, the crossing structure, the structure of the traveling lane) of the current position of the own vehicle is the road structure in which the positioning accuracy on the basis of the positioning information becomes low, or the road structure in which the high position control accuracy is required. It advances to the step S21 and determines to use the first own position, when the road structure is the road structure in which the positioning accuracy becomes low, or the road structure in which the high position control accuracy is required; and it advances to the step S22, when the road structure is not the road structure in which the positioning accuracy becomes low, and is not the road structure in which the high position control accuracy is required.

In the step S21, since it is determined to use the first own position in any one of determination, the road information determination unit 10*i* outputs the road information determination result which is determined to use the first own position. On the other hand, in the step S22, since it is not determined to use the first own position in any one of determination, the road information determination unit 10*i* outputs the road information determination result which is determined to use the second own position.

2-2. Lane Detection Level Determination Unit 10*j*

The lane detection level determination unit 10*j* acquires a detection level of the traveling lane in front of the own vehicle detected by the periphery monitoring apparatus 60, from the automatic driving apparatus 40; determines either the first own position or the second own position to be used, based on the acquired detection level of the traveling lane; and outputs a determination result as a lane detection level determination result.

Then, when the driving mode is the automatic driving mode, the own position selection unit 10*g* determines either the first own position or the second own position to be used, based on the lane detection level determination result. And, when the driving mode is not the automatic driving mode, the own position selection unit 10*g* determines to use the second own position.

When the detection level of the traveling lane in front of the own vehicle is bad, the dependency on the detected traveling lane cannot be made high in the automatic driving. Accordingly, it is desired to perform the automatic driving using high precision position information with high real time property. According to the above configuration, when it is the automatic driving mode, it can be determined appropriately either the first own position or the second own position to be used, based on the detection level of the traveling lane in front of the own vehicle, and the appropriate own position can be calculated.

As mentioned above, the automatic driving apparatus 40 detects lane marking of the traveling lane, such as white line and road shoulder, based on the detection information of the periphery monitoring apparatus 60, such as the camera and the radar. However, the detection level of the white line is largely affected by a blur of the white line, a pavement state of road surface, and the like. The detection level of the white line, the road shoulder, and the like is affected by weather such as rainfall and snowfall, direction of sun such as morning sun and setting sun, nighttime, light of oncoming car in nighttime, and lighting of street and building. When there is no ground object corresponding to lane marking, such as the white line and the road shoulder, on the road, the detection level of the traveling lane becomes low. The detection level of the traveling lane is a recognition ratio of the traveling lane, for example, it is a ratio of the traveling lane whose lane marking is recognized with respect to the traveling lane within a prescribed distance range in front of the own vehicle.

When the detection level (recognition ratio) of the acquired traveling lane is smaller than a determination level, the lane detection level determination unit 10*j* determines to use the first own position. When the detection level (recognition ratio) is larger than the determination level, the lane detection level determination unit 10*j* determines to use the second own position, and outputs a determination result as the lane detection level determination result.

2-3. Weather Information Determination Unit 10*k*

The weather information determination unit 10*k* acquires weather information around the own vehicle; determines either the first own position or the second own position to be used, based on the weather information; and outputs a determination result as a weather information determination result.

Then, when the driving mode is the automatic driving mode, the own position selection unit 10g determines either the first own position or the second own position to be used, based on the weather information determination result. And, when the driving mode is not the automatic driving mode, the own position selection unit 10g determines to use the second own position.

When rapid deterioration of weather (for example, guerrilla rainstorms, rainfall, snowfall) occurs, the receiving condition of the positioning information of the positioning satellites 2 may worsen suddenly, and the positioning accuracy may worsen suddenly. Accordingly, when deterioration of weather is predicted during the automatic driving, it is desired to calculate the own position previously using the positioning reinforcement information with high real time property, and to prepare for rapid deterioration of positioning accuracy. According to the above configuration, when it is the automatic driving mode, it can be determined appropriately either the first own position or the second own position to be used, based on the weather information around the own vehicle, and the appropriate own position can be calculated.

The weather information determination unit 10k acquires the weather information corresponding to the own position, from a server outside the own vehicle which provides weather information, via the ground channel antenna 30. The acquisition period of weather information may be longer than the acquisition period of each positioning reinforcement information. The weather information includes information on various kinds of weather forecasts. When a rapid deterioration of weather which worsens the positioning accuracy is predicted, the weather information determination unit 10k determines to use the first own position. When a rapid deterioration of weather is not predicted, the weather information determination unit 10k determines to use the second own position. For example, when an increase in an amount of rainfall or an amount of snowfall is predicted in a determination time (for example, 1 hour, 30 minutes) in the future (for example, when an amount of rainfall or an amount of snowfall is predicted to increase more than a threshold value, or when a rainfall level or a snowfall level is predicted to increase more than a threshold value), the weather information determination unit 10k determines to use the first own position. Otherwise, the weather information determination unit 10k determines to use the second own position, and outputs a determination result as the weather information determination result.

2-4. Own Position Selection Unit 10g

In the present embodiment, when the driving mode is the automatic driving mode, the own position selection unit 10g determines either the first own position or the second own position to be used, based on one or more (in this example, all) of the road information determination result, the lane detection level determination result, and the weather information determination result. And, when the driving mode is not the automatic driving mode, the own position selection unit 10g determines to use the second own position.

Specifically, in the case where the driving mode is the automatic driving mode, the own position selection unit 10g determines to use the first own position, when any one or more of the road information determination result, the lane detection level determination result, and the weather information determination result is the determination result to use the first own position. And, the own position selection unit 10g determines to use the second own position, when any one of the road information determination result, the lane detection level determination result, and the weather information determination result is not the determination result to use the first own position. On the other hand, the own position selection unit 10g determines to use the second own position, when the driving mode is not the automatic driving mode.

All of the road information determination result, the lane detection level determination result, and the weather information determination result may not be determined, and any one or more of these may be determined. Alternatively, a determination result by other elements may be used additionally. Then, when any one or more of determined one or plural determination results is the determination results to use the first own position, the own position selection unit 10g may determine to use the first own position. Otherwise, the own position selection unit 10g may determine to use the second own position.

<Flowchart of Own Position Selection Unit 10g>

Figure 8:
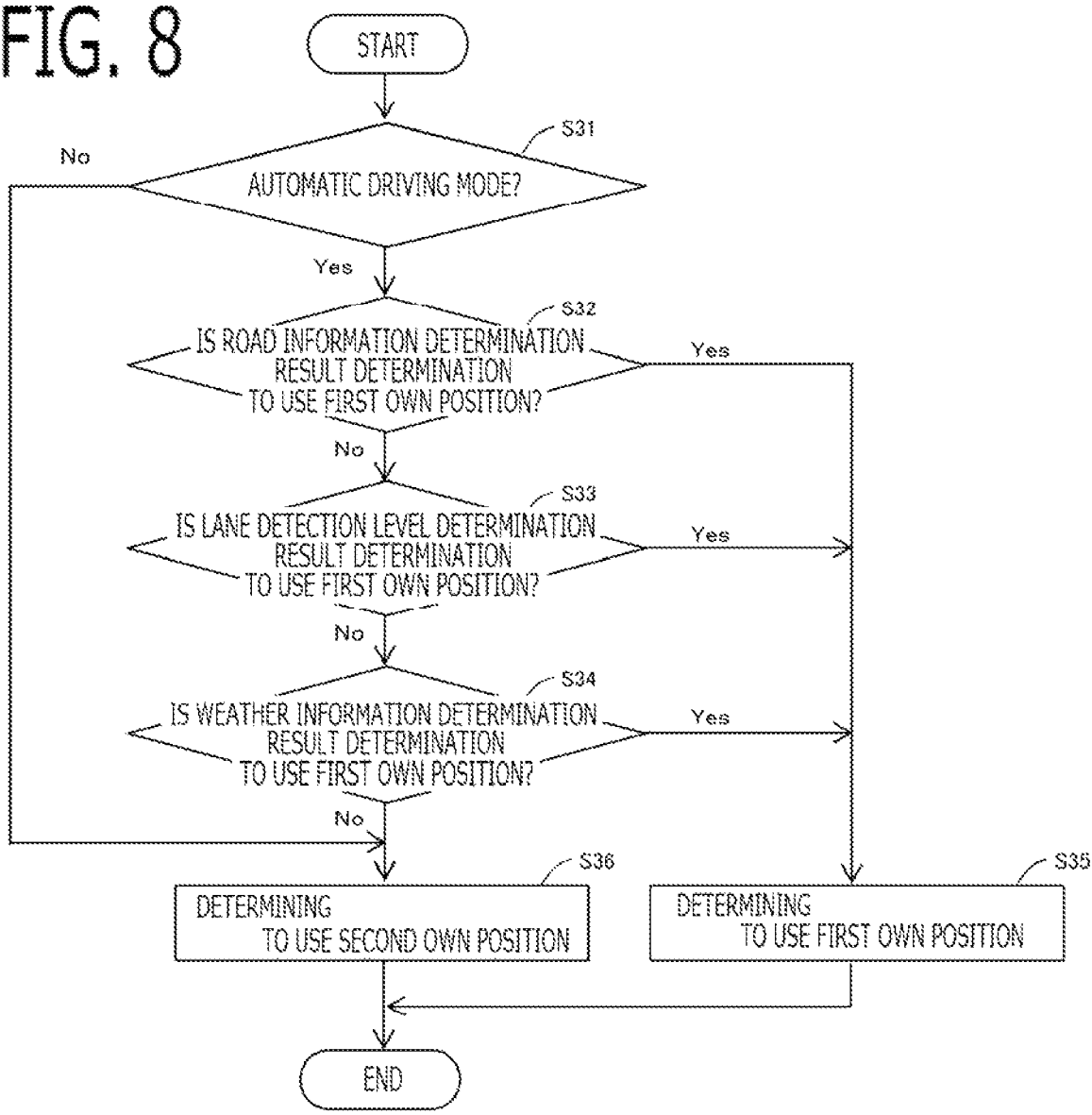
FIG. 8 is a flowchart for explaining processing of the own position selection unit according to Embodiment 2.

Processing of the own position selection unit 10g according to the present embodiment can be configured as shown in the flowchart of FIG. 8. Processing of the flowchart of FIG. 8 is executed at every predetermined calculation period.

First, in the step S31, the own position selection unit 10g determines whether or not the driving mode is the automatic driving mode. When it is the automatic driving mode, it advances to the step S32; and when it is not the automatic driving mode, it advances to the step S36.

In the step S32, the own position selection unit 10g determines whether or not the road information determination result by the road information determination unit 10i is the determination result to use the first own position. When it is the determination result to use the first own position, it advances to the step S35; and when it is not the determination result to use the first own position, it advances to the step S33.

In the step S33, the own position selection unit 10g determines whether or not the lane detection level determination result by the lane detection level determination unit 10j is the determination result to use the first own position. When it is the determination result to use the first own position, it advances to the step S35; and when it is not the determination result to use the first own position, it advances to the step S34.

In the step S34, the own position selection unit 10g determines whether or not the weather information determination result by the weather information determination unit 10k is the determination result to use the first own position. When it is the determination result to use the first own position, it advances to the step S35; and when it is not the determination result to use the first own position, it advances to the step S36.

In the step S35, the own position selection unit 10g determines to use the first own position. On the other hand, in the step S36, the own position selection unit 10g determines to use the second own position.

2-5. Flowchart of Positioning Apparatus 10

Figure 9:
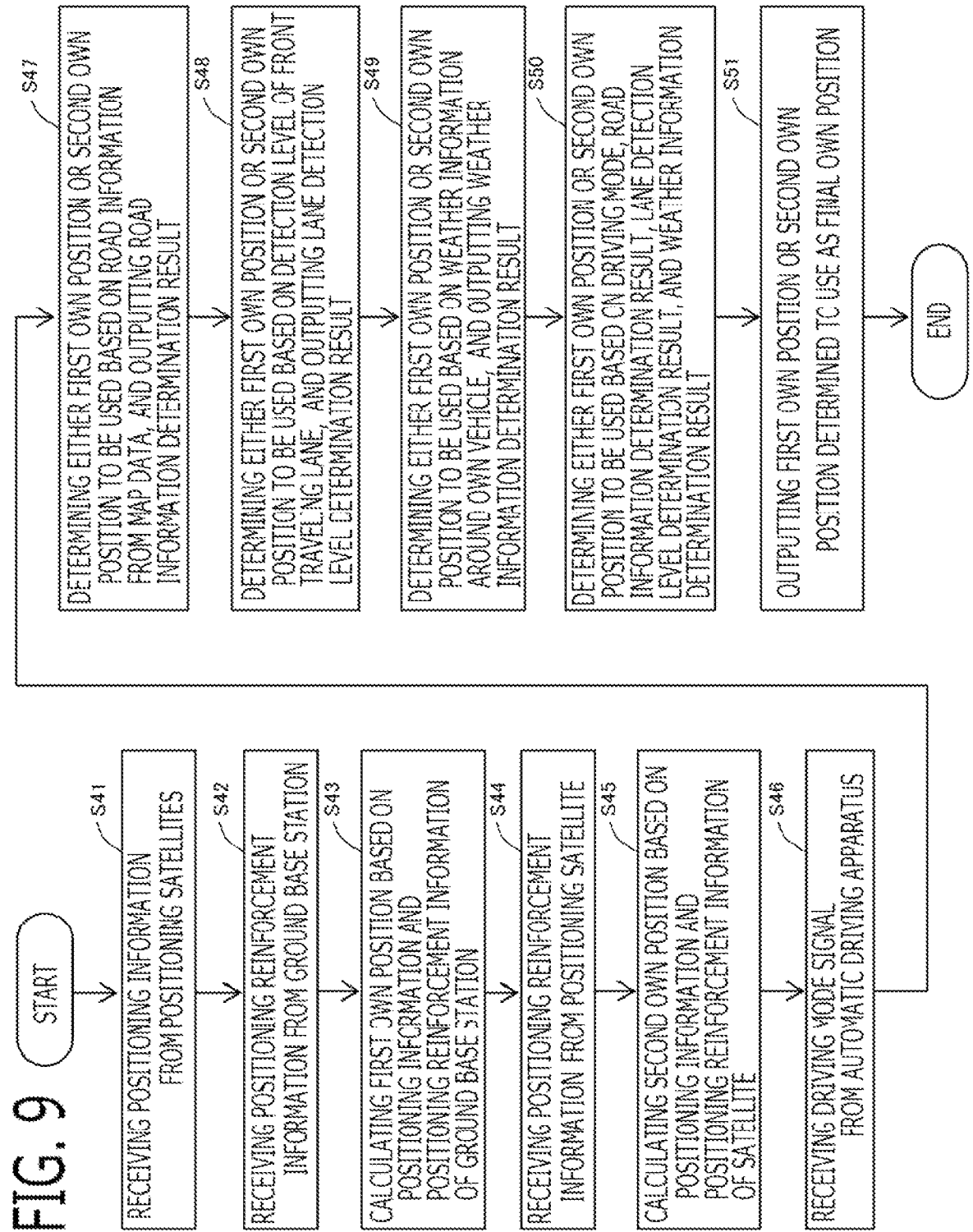
FIG. 9 is a flowchart for explaining processing of the positioning apparatus according to Embodiment 2.

Processing of the positioning apparatus 10 according to the present embodiment can be configured as shown in the flowchart of FIG. 9. Although FIG. 9 shows in the order of steps for convenience, processing of each step is executed at processing timing of each step in turn.

In the step S41, similarly to Embodiment 1, the satellite positioning information reception unit 10a receives positioning information from the positioning satellites 2 via the satellite channel antenna 20.

In the step S42, similarly to Embodiment 1, the ground reinforcement information reception unit 10b receives the positioning reinforcement information of the ground base station from the ground base station 3 via the ground channel antenna 30.

In the step S43, similarly to Embodiment 1, the first own position calculation unit 10c calculates the first own position based on the positioning information and the positioning reinforcement information of the ground base station.

In the step S44, similarly to Embodiment 1, the satellite reinforcement information reception unit 10d receives the positioning reinforcement information of the satellite from the positioning satellite 2 via the satellite channel antenna 20.

In the step S45, similarly to Embodiment 1, the second own position calculation unit 10e calculates the second own position based on the positioning information and the positioning reinforcement information of the satellite.

In the step S46, similarly to Embodiment 1, the driving mode reception unit 10f receives the driving mode signal which indicates whether or not a driving mode of the own vehicle is the automatic driving mode from the automatic driving apparatus 40 of the own vehicle which is an arithmetic object of an own position.

In the step S47, as mentioned above, the road information determination unit 10i acquires one or both (in this example, both) of road information around the own vehicle, and road information along the target traveling route of the own vehicle, from map data; determines either the first own position or the second own position to be used, based on the acquired road information; and outputs a determination result as a road information determination result. This determination processing is performed at every predetermined calculation period.

In the step S48, as mentioned above, the lane detection level determination unit 10j acquires the detection level of the traveling lane in front of the own vehicle detected by the periphery monitoring apparatus 60, from the automatic driving apparatus 40; determines either the first own position or the second own position to be used, based on the acquired detection level of the traveling lane; and outputs a determination result as a lane detection level determination result. This determination processing is performed at every predetermined calculation period.

In the step S49, as mentioned above, the weather information determination unit 10k acquires weather information around the own vehicle, determines either the first own position or the second own position to be used, based on the weather information, and outputs a determination result as a weather information determination result. This determination processing is performed at every predetermined calculation period.

In the step S50, as mentioned above, when the driving mode is the automatic driving mode, the own position selection unit 10g determines either the first own position or the second own position to be used, based on one or more (in this example, all) of the road information determination result, the lane detection level determination result, and the weather information determination result. And, when the driving mode is not the automatic driving mode, the own position selection unit 10g determines to use the second own position. The determination processing is performed at every predetermined calculation period, and the calculation period does not need to be a high speed.

In the step S51, similarly to Embodiment 1, the own position output unit 10h outputs the first own position or the second own position which is determined to be used by the own position selection unit 10g, as the final own position. The final own position is transmitted to the automatic driving apparatus 40. The output processing is performed at every calculation period of the first own position or the second own position.

3. Embodiment 3

Next, the positioning apparatus 10 according to Embodiment 3 will be explained. The explanation for constituent parts the same as those in each of Embodiments 1 or 2 will be omitted. The basic configuration of the positioning apparatus 10, the automatic driving apparatus 40 and the like according to the present embodiment is the same as that of Embodiment 1 or 2. It is different from Embodiments 1 and 2 in configuration of the ground reinforcement information reception unit 10b, the satellite reinforcement information reception unit 10d, and the like.

In Embodiments 1 and 2, regardless of whether it is determined to use the first own position or the second own position by the own position selection unit 10g, the ground reinforcement information reception unit 10b and the satellite reinforcement information reception unit 10d always receive the positioning reinforcement information of the ground base station and the positioning reinforcement information of the satellite. However, communication cost of the ground channel increases, and processing load and power consumption of the positioning apparatus 10 increase. When many automatic driving vehicles exist and the capacity of ground channel, such as the mobile phone channel, has a restriction, the radio wave band of the ground channel is oppressed.

Then, in the present embodiment, when it is determined to use the first own position by the own position selection unit 10g, the ground reinforcement information reception unit 10b receives the positioning reinforcement information of the ground base station from the ground base station 3. And, when it is determined to use the second own position, the ground reinforcement information reception unit 10b does not receive the positioning reinforcement information of the ground base station from the ground base station 3. When it is determined to use the first own position by the own position selection unit 10g, the first own position calculation unit 10c calculates the first own position based on the positioning information and the positioning reinforcement information of the ground base station. And, when it is determined to use the second own position, the first own position calculation unit 10c does not calculate the first own position. In the case of receiving the positioning reinforcement information of the ground base station, since the reception processing of positioning reinforcement information of the ground base station itself and the calculation processing of the first own position itself are similar to those of Embodiment 1, explanation is omitted.

According to this configuration, only when the calculation of the first own position is necessary, it communicates with the ground base station 3, the positioning reinforcement information of the ground base station is received, and the first own position is calculated. Accordingly, the increase in communication cost can be suppressed, and the increase in the processing load and the power consumption of the positioning apparatus 10 can be suppressed. And, oppression of the radio wave band of the ground channel can be suppressed.

The ground reinforcement information reception unit 10b communicates with the ground base station 3 periodically, and determines whether or not the positioning reinforcement information is receivable from the ground base station, and transmits information on whether or not it is receivable, to the own position selection unit 10g. A determination period may be set longer than the receiving period of the positioning reinforcement information of the ground base station. As explained in Embodiment 1, when the positioning reinforcement information of the ground base station cannot be received and the positioning reinforcement information of the satellite can be received, the own position selection unit 10g determines to use the second own position.

When it is determined to use the second own position by the own position selection unit 10g, the satellite reinforcement information reception unit 10d receives the positioning reinforcement information of the satellite from the positioning satellite 2. And, when it is determined to use the first own position, the satellite reinforcement information reception unit 10d does not receive the positioning reinforcement information of the satellite from the positioning satellite 2. When it is determined to use the second own position by the own position selection unit 10g, the second own position calculation unit 10e calculates the second own position based on the positioning information and the positioning reinforcement information of the satellite. And, when it is determined to use the first own position, the second own position calculation unit 10e does not calculate the second own position. In the case of receiving the positioning reinforcement information of the satellite, since the reception processing of positioning reinforcement information of the satellite itself and the calculation processing of the second own position itself are similar to those of Embodiment 1, explanation is omitted.

According to this configuration, only when the calculation of the second own position is necessary, since the positioning reinforcement information of the satellite is received from the positioning satellite 2 and the second own position is calculated, the increase in the processing load and the power consumption of the positioning apparatus 10 can be suppressed.

The satellite reinforcement information reception unit 10d determines periodically whether or not the positioning reinforcement information is receivable from the positioning satellite 2, and transmits information on whether or not it is receivable, to the own position selection unit 10g. For example, the satellite reinforcement information reception unit 10d may determine whether or not the positioning reinforcement information is included in received information from the positioning satellite 2, and may not receive the positioning reinforcement information itself. A determination period may be set longer than the receiving period of the positioning reinforcement information of the satellite. As explained in Embodiment 1, when the positioning reinforcement information of the ground base station is receivable and the positioning reinforcement information of the satellite is not receivable, the own position selection unit 10g determines to use the first own position.

<Flowchart (Own Position Selection Unit 10g Similar to Embodiment 1)>

Figure 10:
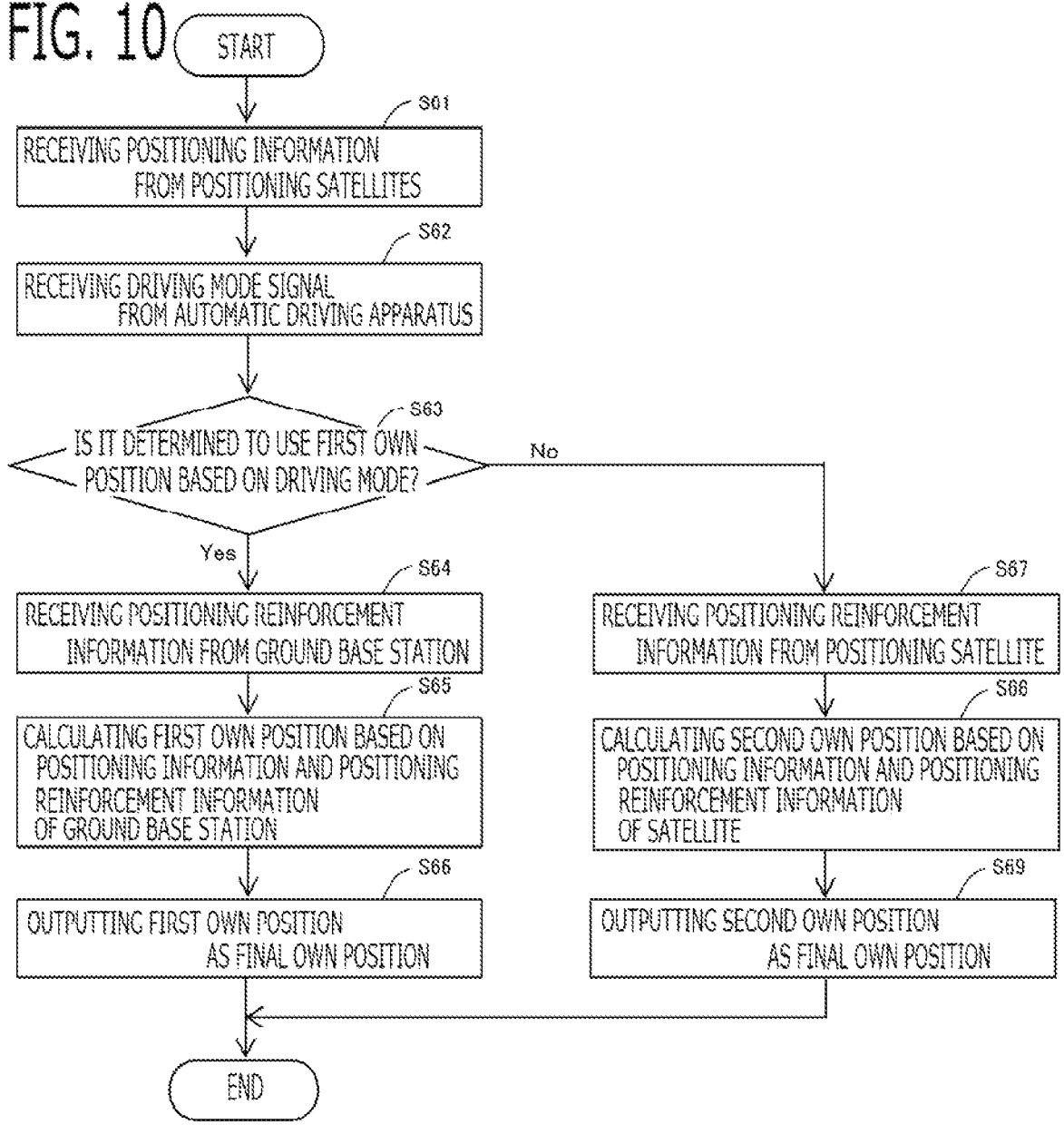
FIG. 10 is a flowchart for explaining processing of the positioning apparatus according to Embodiment 3.

In the case where the own position selection unit 10g is configured similar to Embodiment 1, processing of the positioning apparatus 10 according to the present embodiment can be configured as shown in the flowchart of FIG. 10. Although FIG. 10 shows in the order of steps for convenience, processing of each step is executed at processing timing of each step in turn.

In the step S61, similarly to Embodiment 1, the satellite positioning information reception unit 10a receives positioning information from the positioning satellites 2 via the satellite channel antenna 20.

In the step S62, similarly to Embodiment 1, the driving mode reception unit 10f receives the driving mode signal which indicates whether or not the driving mode of the own vehicle is the automatic driving mode from the automatic driving apparatus 40 of the own vehicle which is an arithmetic object of an own position.

In the step S63, similarly to Embodiment 1, the own position selection unit 10g determines either the first own position or the second own position to be used, based on the driving mode. When it is determined to use the first own position, it advances to the step S64; and when it is determined to use the second own position, it advances to the step S67.

In the step S64, as mentioned above, since it is determined to use the first own position by the own position selection unit 10g, the ground reinforcement information reception unit 10b receives the positioning reinforcement information of the ground base station from the ground base station 3 via the ground channel antenna 30.

Then, in the step S65, the first own position calculation unit 10c calculates the first own position based on the positioning information and the positioning reinforcement information of the ground base station.

In the step S66, the own position output unit 10h outputs the first own position as the final own position. The final own position is transmitted to the automatic driving apparatus 40.

In the step S67, as mentioned above, since it is determined to use the second own position by the own position selection unit 10g, the satellite reinforcement information reception unit 10d receives the positioning reinforcement information of the satellite from the positioning satellite 2.

Then, in the step S68, the second own position calculation unit 10e calculates the second own position based on the positioning information and the positioning reinforcement information of the satellite.

In the step S69, the own position output unit 10h outputs the second own position as the final own position. The final own position is transmitted to the automatic driving apparatus 40.

<Flowchart (Own Position Selection Unit 10g and the Like Similar to Embodiment 2)>

Figure 11:
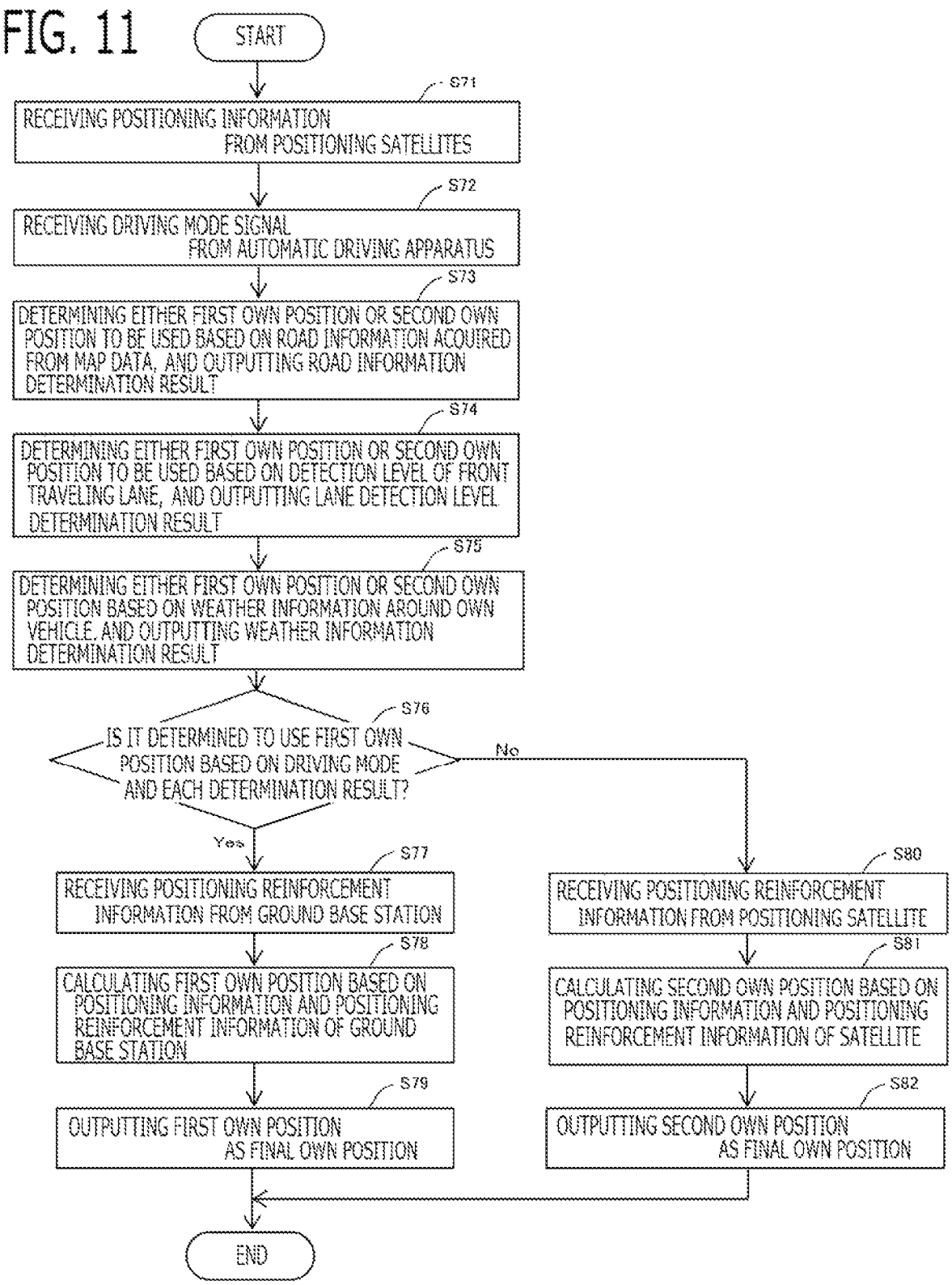
FIG. 11 is a flowchart for explaining processing of the positioning apparatus according to Embodiment 3.

In the case where the own position selection unit 10g and the like are configured similar to Embodiment 2, processing of the positioning apparatus 10 according to the present embodiment can be configured as shown in the flowchart of FIG. 11. Although FIG. 11 shows in the order of steps for convenience, processing of each step is executed at processing timing of each step in turn.

In the step S71, similarly to Embodiment 1, the satellite positioning information reception unit 10a receives positioning information from the positioning satellites 2 via the satellite channel antenna 20.

In the step S72, similarly to Embodiment 1, the driving mode reception unit 10f receives the driving mode signal which indicates whether or not a driving mode of the own vehicle is the automatic driving mode from the automatic driving apparatus 40 of the own vehicle which is an arithmetic object of an own position.

In the step S73, similarly to Embodiment 2, the road information determination unit 10i acquires one or both (in this example, both) of road information around the own vehicle, and road information along the target traveling route of the own vehicle from map data; determines either the first own position or the second own position to be used, based on the acquired road information; and outputs a determination result as a road information determination result.

In the step S74, similarly to Embodiment 2, the lane detection level determination unit 10*j* acquires the detection level of the traveling lane in front of the own vehicle detected by the periphery monitoring apparatus 60, from the automatic driving apparatus 40; determines either the first own position or the second own position to be used, based on the acquired detection level of the traveling lane; and outputs a determination result as a lane detection level determination result.

In the step S75, similarly to Embodiment 2, the weather information determination unit 10*k* acquires weather information around the own vehicle; determines either the first own position or the second own position to be used, based on the weather information; and outputs a determination result as a weather information determination result.

In the step S76, similarly to Embodiment 2, when the driving mode is the automatic driving mode, the own position selection unit 10*g* determines either the first own position or the second own position to be used, based on one or more (in this example, all) of the road information determination result, the lane detection level determination result, and the weather information determination result. And, when the driving mode is not the automatic driving mode, the own position selection unit 10*g* determines to use the second own position. When it is determined to use the first own position, it advances to the step S77; and when it is determined to use the second own position, it advances to the step S80.

In the step S77, as mentioned above, since it is determined to use the first own position by the own position selection unit 10*g*, the ground reinforcement information reception unit 10*b* receives the positioning reinforcement information of the ground base station from the ground base station 3 via the ground channel antenna 30.

Then, in the step S78, the first own position calculation unit 10*c* calculates the first own position based on the positioning information and the positioning reinforcement information of the ground base station.

In the step S79, the own position output unit 10*h* outputs the first own position as the final own position. The final own position is transmitted to the automatic driving apparatus 40.

In the step S80, as mentioned above, since it is determined to use the second own position by the own position selection unit 10*g*, the satellite reinforcement information reception unit 10*d* receives the positioning reinforcement information of the satellite from the positioning satellite 2.

Then, in the step S81, the second own position calculation unit 10*e* calculates the second own position based on the positioning information and the positioning reinforcement information of the satellite.

In the step S82, the own position output unit 10*h* outputs the second own position as the final own position. The final own position is transmitted to the automatic driving apparatus 40.

Although the present disclosure is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations to one or more of the embodiments. It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

What is claimed is:

1. A positioning apparatus comprising at least one processor configured to implement:
    a satellite positioning information receptor that receives positioning information from positioning satellites;
    a ground reinforcement information receptor that receives positioning reinforcement information from a ground base station;
    a first own position calculator that calculates a first own position, based on the positioning information and the positioning reinforcement information of the ground base station;
    a satellite reinforcement information receptor that receives positioning reinforcement information from the positioning satellite;
    a second own position calculator that calculates a second own position based on the positioning information and the positioning reinforcement information of the satellite;
    a driving mode receptor that receives a driving mode signal which indicates whether or not a driving mode of an own vehicle is an automatic driving mode, from an automatic driving apparatus of the own vehicle which is an arithmetic object of an own position;
    an own position selector that determines either the first own position or the second own position to be used, based on the driving mode; and
    an own position outputter that outputs the first own position or the second own position which is determined to be used by the own position selector, as a final own position.

2. The positioning apparatus according to claim 1, wherein the own position selector determines to use the first own position, when the driving mode is the automatic driving mode, and determines to use the second own position, when the driving mode is not the automatic driving mode.

3. The positioning apparatus according to claim 1, wherein the at least one processor is further configured to implement:
    a road information determiner that acquires one or both of road information around the own vehicle, and road information on a target traveling route of the own vehicle, from map data; determines either the first own position or the second own position to be used, based on the acquired road information; and outputs a determination result as a road information determination result,
    wherein the own position selector determines either the first own position or the second own position to be used, based on the road information determination result, when the driving mode is the automatic driving mode, and determines to use the second own position, when the driving mode is not the automatic driving mode.

4. The positioning apparatus according to claim 3, wherein the road information determiner acquires one or both of a lane width of a traveling lane where the own vehicle is traveling, and a lane width of a traveling lane on the target traveling route, as the road information; and determines to use the first own position, when the acquired lane width is smaller than a determination width.

5. The positioning apparatus according to claim 3,
wherein the road information determiner acquires one or both of a curvature of a traveling lane where the own vehicle is traveling, and a curvature of a traveling lane on the target traveling route, as the road information; and determines to use the first own position, when the acquired curvature is larger than a determination curvature.

6. The positioning apparatus according to claim 3,
wherein the road information determiner acquires one or both of information on a road structure of a traveling lane where the own vehicle is traveling, and information on a road structure of a traveling lane on the target traveling route, as the road information; and determines to use the first own position, when the acquired road structure is a road structure in which a positioning accuracy on a basis of the positioning information becomes low, or a road structure in which a high position control accuracy is required.

7. The positioning apparatus according to claim 6,
wherein the road information determiner acquires one or both of information on a crossing structure of the traveling lane, and information on a structure of the traveling lane, as information on the road structure of the traveling lane.

8. The positioning apparatus according to claim 1, wherein the at least one processor is further configured to implement:
a lane detection level determiner that acquires a detection level of a traveling lane in front of the own vehicle detected by a periphery monitoring apparatus, from the automatic driving apparatus; determines either the first own position or the second own position to be used, based on the acquired detection level of the traveling lane; and outputs a determination result as a lane detection level determination result,
wherein the own position selector determines either the first own position or the second own position to be used, based on the lane detection level determination result, when the driving mode is the automatic driving mode; and determines to use the second own position, when the driving mode is not the automatic driving mode.

9. The positioning apparatus according to claim 1, wherein the at least one processor is further configured to implement:
a weather information determiner that acquires a weather information around the own vehicle; determines either the first own position or the second own position, based on the weather information; and outputs a determination result as a weather information determination result,
wherein the own position selector determines either the first own position or the second own position to be used, based on the weather information determination result, when the driving mode is the automatic driving mode; and determines to use the second own position, when the driving mode is not the automatic driving mode.

10. The positioning apparatus according to claim 1,
wherein the ground reinforcement information receptor receives the positioning reinforcement information of the ground base station from the ground base station, when it is determined to use the first own position by the own position selector; and does not receive the positioning reinforcement information of the ground base station from the ground base station, when it is determined to use the second own position, and
wherein the first own position calculator calculates the first own position, based on the positioning information and the positioning reinforcement information of the ground base station, when it is determined to use the first own position by the own position selector; and does not calculate the first own position, when it is determined to use the second own position.

11. The positioning apparatus according to claim 1,
wherein the satellite reinforcement information receptor receives the positioning reinforcement information of the satellite from the positioning satellite, when it is determined to use the second own position by the own position selector; and does not receive the positioning reinforcement information of the satellite from the positioning satellite, when it is determined to use the first own position, and
wherein the second own position calculator calculates the second own position, based on the positioning information and the positioning reinforcement information of the satellite, when it is determined to use the second own position by the own position selector; and does not calculate the second own position, when it is determined to use the first own position.

12. The positioning apparatus according to claim 2,
wherein determining to use the first own position, when the driving mode is the automatic driving mode, and determining to use the second own position, when the driving mode is not the automatic driving mode, comprises determining to use the first own position and to not use the second own position, based on the driving mode being determined to be the automatic driving mode, and determining to use the second own position and to not use the first own position, based on the driving mode being determined to not be the automatic driving mode.

13. The positioning apparatus according to claim 1,
wherein determining to use the first own position, when the driving mode is the automatic driving mode, and determining to use the second own position, when the driving mode is not the automatic driving mode, comprises implementing determining to use the first own position, when the driving mode is the automatic driving mode, and determining to use the second own position, when the driving mode is not the automatic driving mode at predetermined periodic intervals.

* * * * *